(12) United States Patent
Van Der Schrick et al.

(10) Patent No.: US 8,636,831 B2
(45) Date of Patent: Jan. 28, 2014

(54) PROCESS FOR MONOMER RECOVERY FROM A POLYMERIZATION PROCESS

(75) Inventors: Bernard Van Der Schrick, Brussells (BE); Eric Damme, Arquennes (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 485 days.

(21) Appl. No.: 12/811,848

(22) PCT Filed: Jan. 16, 2009

(86) PCT No.: PCT/EP2009/050516
§ 371 (c)(1),
(2), (4) Date: Nov. 5, 2010

(87) PCT Pub. No.: WO2009/090254
PCT Pub. Date: Jul. 23, 2009

(65) Prior Publication Data
US 2011/0046323 A1 Feb. 24, 2011

(30) Foreign Application Priority Data
Jan. 18, 2008 (EP) .................................... 08150410

(51) Int. Cl.
*B01D 19/00* (2006.01)
*B01D 3/00* (2006.01)

(52) U.S. Cl.
USPC ................................ 95/186; 203/71; 95/172

(58) Field of Classification Search
None
See application file for complete search history.

(56) References Cited

U.S. PATENT DOCUMENTS

| | | | |
|---|---|---|---|
| 3,969,470 A | | 7/1976 | Spiegelman |
| 4,589,957 A | * | 5/1986 | Sherk et al. ..................... 203/75 |
| 5,741,350 A | * | 4/1998 | Rowles et al. .................... 95/42 |

FOREIGN PATENT DOCUMENTS

WO    WO 96/27634    9/1996

* cited by examiner

*Primary Examiner* — David W Wu
*Assistant Examiner* — Elizabeth Eng (57) ABSTRACT

The present relates to a process for optimizing the recovery of unreacted monomers from a polymerization process, wherein said process comprises the steps of
  recovering a fluid stream generated by the separation of the polyolefin product from the polymerization fluid comprising unreacted monomers and optionally comonomers;
  contacting said fluid stream in an absorption zone with a scrub liquid comprising at least one $C_{4-10}$ hydrocarbons, thereby absorbing at least a portion of the unreacted monomers in said scrub liquid; and
  withdrawing from said absorption zone (i) a vapor overhead comprising light gas and (ii) an absorber bottoms scrub liquid comprising said $C_{4-10}$ hydrocarbons and said unreacted monomer; thereby recovering said unreacted monomer in said absorber bottoms scrub liquid comprising said $C_{4-10}$ hydrocarbons.

The present invention also concerns a process for the recovery of unreacted monomers from a gas phase or slurry polymerization process, and also concerns a process for the production of polyolefins.

6 Claims, 3 Drawing Sheets

PROCESS FOR MONOMER RECOVERY FROM A POLYMERIZATION PROCESS

CROSS-REFERENCE TO RELATED APPLICATIONS

This application claims the benefit of PCT/EP2009/050516, filed Jan. 16, 2009, which claims priority from EP 08150410.2, filed Jan. 18, 2008.

FIELD OF THE INVENTION

The present invention relates generally to olefin polymerization. In particular, the present relates to a process for optimizing the recovery of unreacted monomers from a polymerization process.

BACKGROUND OF THE INVENTION

Polyolefins such as polyethylene and polypropylene may be prepared by a gas phase or slurry polymerization process, which involves the polymerization of olefin monomer with the aid of catalyst and optionally, if required depending on the used catalyst, a co-catalyst.

Following such polymerization process, a polymerization effluent is produced comprising polymer solids in a fluid that contains unreacted monomer, and optionally unreacted co-monomer.

In gas phase polymerization, polyolefin processes are frequently involved with the separation between monomers such as ethylene or propylene and inert gas like nitrogen, hydrogen . . . . Ethylene is ideally recycled to the reactor while other components have to be purged in order to avoid accumulation. An effective recycling of ethylene needs a separation between monomer (namely ethylene or propylene) and inert components.

In slurry polymerization, polyolefin processes are frequently involved with the separation between diluent such as isobutane, and monomers such as ethylene and inert gas like nitrogen, hydrogen . . . .

The composition of the stream to be separated depends on the process, but gas phase as well as slurry process have, at one point of the process, the necessity to split these components in order to be able to recycle ethylene.

It is highly desirable to recover the unreacted monomer, and unreacted co-monomer, since there is an economic interest in re-using these separated components in a polymerization process.

Adsorption processes have been proposed to separate hydrocarbons from purge or vent gas streams produced by processes similar to polyethylene and polypropylene reactor systems.

EP0722953 discloses recovery of hydrocarbons from product purge gas generated in the synthesis of a polyalkene product, comprises contacting the product purge gas comprising inert gas, unreacted alkene monomer, one or more heavy hydrocarbons, and one or more intermediate hydrocarbons, in a scrubber with a scrub liquid feed comprising at least one of the one or more intermediate hydrocarbons, thereby absorbing at least a portion of the one or more heavy hydrocarbons from the product purge gas into the scrub liquid. A vapor overhead comprising inert gas and at least a portion of the alkene monomer and an absorber bottoms scrub liquid comprising at least a portion of the one or more heavy hydrocarbons are removed from the absorption zone. The process disclosed in this document is cumbersome as it involves several counter-flow heat exchangers for recovering the alkene monomer from the vapor overhead.

It is therefore an aim of the present invention to provide a separation process between ethylene and inert gas, as simple as possible, and with little demand in energy.

SUMMARY OF THE INVENTION

The present inventors have found that a separation process comprising an absorption-desorption cycle provided efficient monomer recovery and also respected the rules of simplicity and low energy consumption. The present process has the advantage of being a simplified process, which does not require several counter flow heat exchangers for recovering the unreacted monomers.

The present invention concerns a process for the recovery of unreacted monomers from a polyolefin polymerization process, comprising the steps of recovering a fluid stream generated by the separation of the polyolefin product from the polymerization fluid comprising unreacted monomers and optionally comonomers;

contacting said fluid stream in an absorption zone with a scrub liquid comprising at least one $C_{4-10}$ hydrocarbons, thereby absorbing at least a portion of the unreacted monomers in said scrub liquid; and withdrawing from said absorption zone (i) a vapor overhead comprising light gas and (ii) an absorber bottoms scrub liquid comprising said $C_{4-10}$ hydrocarbons and said unreacted monomer; thereby recovering said unreacted monomer in said absorber bottoms scrub liquid comprising said $C_{4-10}$ hydrocarbons.

The present invention also concerns a process for the recovery of unreacted monomers from a gas phase polymerization process, comprising the steps of recovering a fluid stream generated by the separation of the polyolefin product from the polymerization fluid comprising unreacted monomers and optionally comonomers by purging said polymerization product with an inert gas;

contacting said fluid stream comprising unreacted monomers, inert gas and optionally comonomers in an absorption zone with a scrub liquid comprising at least one $C_{4-10}$ hydrocarbons, thereby absorbing at least a portion of the unreacted monomers in said scrub liquid; and withdrawing from said absorption zone (i) a vapor overhead comprising said purge inert gas and (ii) an absorber bottoms scrub liquid comprising said $C_{4-10}$ hydrocarbons and said unreacted monomer;

flashing to a reduced pressure said absorber bottoms scrub liquid, and separating the resulting flashed stream into a vapor containing the unreacted monomer and a liquid comprising said $C_{4-10}$ hydrocarbons.

The present invention also concerns a process for the recovery of unreacted monomers from a slurry polymerization process comprising the steps of a) recovering a fluid stream from a polymer slurry comprising essentially liquid diluent, unreacted monomer, comonomers and solid polyolefin particles, by separating at least a majority of the diluent and unreacted monomer and comonomers from said solid particles, b) distilling said fluid stream, and withdrawing from said distillation a bottom stream comprising $C_{4-10}$ hydrocarbons, and an overhead stream comprising unreacted monomer and diluent, c) distilling said overhead stream and withdrawing (i) a bottom stream comprising substantially olefin-free hydrocarbon diluent, optionally a side stream comprising hydrocarbon diluent, and (ii) an overhead vapor stream comprising unreacted monomer and light gas, d) contacting said removed overhead vapor stream in an absorption zone with a scrub liquid comprising at least one $C_{4-10}$ hydrocarbons, thereby absorbing at least a portion of the unreacted monomers in said scrub liquid; and e) withdrawing from said absorption zone (i) a vapor overhead and (ii) an absorber bottoms scrub liquid comprising said $C_{4-10}$ hydrocarbons and said unreacted monomer.

The present invention concerns a process for the production of polyolefins comprising the steps of
introducing into a reactor one or more olefin reactants, polymerization catalysts and diluents, and while circulating said reactants, catalysts and diluents,
polymerizing one or more olefin reactants to produce solid olefin polymer particles,
recovering olefin polymer product from the reaction;
recovering a fluid stream generated by the separation of the polyolefin product from the polymerization fluid comprising unreacted monomers and optionally comonomers;
contacting said fluid stream in an absorption zone with a scrub liquid comprising at least one $C_{4-10}$ hydrocarbons, thereby absorbing at least a portion of the unreacted monomers in said scrub liquid; and
withdrawing from said absorption zone (i) a vapor overhead comprising light gas and (ii) an absorber bottoms scrub liquid comprising said $C_{4-10}$ hydrocarbons and said unreacted monomer; thereby recovering said unreacted monomer in said absorber bottoms scrub liquid comprising said $C_{4-10}$ hydrocarbons.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. The description is only given by way of example and does not limit the invention. The reference numbers relate to the hereto-annexed figures.

DETAILED DESCRIPTION OF THE INVENTION

The invention provides a system for monomer recovery in a polyolefin polymerization process, wherein the fluid containing unreacted monomer recovered from the polymerization process is subjected to an absorption/desorption unit. In a preferred example, such fluid containing unreacted monomer is issued from the effluent of an ethylene polymerization process. Advantageously, application of the present recovery process includes the benefits of simplicity and low energy consumption.

In a first aspect, the present invention concerns a process for the recovery of unreacted monomers from a polyolefin polymerization process, comprising the steps of
recovering a fluid stream generated by the separation of the polyolefin product from the polymerization fluid comprising unreacted monomers and optionally comonomers;
contacting said fluid stream in an absorption zone with a scrub liquid comprising at least one $C_{4-10}$ hydrocarbons, thereby absorbing at least a portion of the unreacted monomers in said scrub liquid; and
withdrawing from said absorption zone (i) a vapor overhead comprising light gas and (ii) an absorber bottoms scrub liquid comprising said $C_{4-10}$ hydrocarbons and said unreacted monomer; thereby recovering said unreacted monomer in said absorber bottoms scrub liquid comprising said $C_{4-10}$ hydrocarbons.

In an embodiment, said absorber bottoms scrub liquid comprising said $C_{4-10}$ hydrocarbons and at least a portion of said unreacted monomer is recycled to the polymerization reaction.

In another embodiment, said unreacted monomer is recovered from said absorber bottoms scrub liquid by first flashing to a reduced pressure said absorber bottoms scrub liquid, and separating the resulting flashed stream into a vapor containing the unreacted monomer and a liquid comprising said $C_{4-10}$ hydrocarbons.

The vapor containing the unreacted monomer can then be compressed and recycled to said polymerization process. The liquid comprising said $C_{4-10}$ hydrocarbons is preferably cooled and pumped back to said absorption zone as the scrub liquid.

In an embodiment, the $C_{4-10}$ hydrocarbon is selected from hexane, hexene-1, or octane, preferably hexane or hexene-1.

The fluid stream to be treated according to the present invention will generally be an overhead stream coming from a flash tank and/or purge columns of a polymerization reactor, wherein a stream containing solvent, polymer and unreacted monomers is flashed or otherwise treated to remove solvent or diluent and monomers therefrom.

The polymerization process may be carried out in any type of polymerization system including, but not limited to, a solution, gas phase or slurry process, or combinations thereof.

In a preferred embodiment, the present invention provides a process for the recovery of unreacted monomers from a slurry polymerization process comprising the steps of
a) recovering a fluid stream from a polymer slurry comprising essentially liquid diluent, unreacted monomer, comonomers and solid polyolefin particles, by separating at least a majority of the diluent and unreacted monomer and comonomers from said solid particles,
b) distilling said fluid stream, and withdrawing from said distillation a bottom stream comprising $C_{4-10}$ hydrocarbons, and an overhead stream comprising unreacted monomer and diluent,
c) distilling said overhead stream and withdrawing (i) a bottom stream comprising substantially olefin-free hydrocarbon diluent, optionally a side stream comprising hydrocarbon diluent, and (ii) an overhead vapor stream comprising unreacted monomer and light gas,
d) contacting said removed overhead vapor stream in an absorption zone with a scrub liquid comprising at least one $C_{4-10}$ hydrocarbons, thereby absorbing at least a portion of the unreacted monomers in said scrub liquid; and e) withdrawing from said absorption zone (i) a vapor overhead and (ii) an absorber bottoms scrub liquid comprising said $C_{4-10}$ hydrocarbons and said unreacted monomer;

wherein the bottom stream of step (b) comprising $C_{4-10}$ hydrocarbons, is combined with makeup scrub liquid and cooled to provide said scrub liquid feed to said gas-liquid absorption zone.

Said overhead vapor stream of step (c) comprising unreacted monomer and light gas can be compressed and cooled prior to treatment in said gas-liquid absorption zone. In said process, it is also possible to recycle said absorber bottoms scrub liquid to the polymerization reaction.

Preferably, said unreacted monomer is recovered from said absorber bottoms scrub liquid by first flashing to a reduced pressure said absorber bottoms scrub liquid, and separating the resulting flashed stream into a vapor containing the unreacted monomer and a liquid comprising said $C_{4-10}$ hydrocarbons. In this embodiment, said vapor containing the unreacted monomer can further be compressed and recycled to said polymerization process. Said liquid comprising said $C_{4-10}$ hydrocarbons can also be cooled and pumped back to said absorption zone as the scrub liquid.

In another preferred embodiment, the present invention provides a process for the recovery of unreacted monomers from a slurry polymerization process comprising the steps of
a) recovering a fluid stream from a polymer slurry comprising essentially liquid diluent, unreacted monomer, comonomers and solid polyolefin particles, by separating at least a majority of the diluent and unreacted monomer and comonomers from said solid particles,
b) distilling said fluid stream, and withdrawing from said distillation a bottom stream comprising $C_{4-10}$ hydrocarbons, and an overhead stream comprising unreacted monomer and diluent,
c) distilling said overhead stream and withdrawing (i) a bottom stream comprising substantially olefin-free hydrocarbon diluent, optionally a side stream comprising hydrocarbon diluent, and (ii) an overhead vapor stream comprising unreacted monomer and light gas,
d) contacting said removed overhead vapor stream in an absorption zone with a scrub liquid comprising at least one $C_{4-10}$ hydrocarbons, thereby absorbing at least a portion of the unreacted monomers in said scrub liquid; and
e) withdrawing from said absorption zone (i) a vapor overhead and (ii) an absorber bottoms scrub liquid comprising said $C_{4-10}$ hydrocarbons and said unreacted monomer; and wherein said unreacted monomer is recovered from said absorber bottoms scrub liquid by first flashing to a reduced pressure said absorber bottoms scrub liquid, and separating the resulting flashed stream into a vapor containing the unreacted monomer and a liquid comprising said $C_{4-10}$ hydrocarbons. In an embodiment, said vapor containing the unreacted monomer is compressed and recycled to said polymerization process. According to another embodiment, said liquid comprising said $C_{4-10}$ hydrocarbons is cooled and pumped back to said absorption zone as the scrub liquid.

The overhead vapor stream of step (c) comprising unreacted monomer and light gas can be compressed and cooled prior to treatment in said gas-liquid absorption zone. In said process, it is also possible to recycle said absorber bottoms scrub liquid back to the polymerization reaction.

In yet another embodiment, the polymerization reaction is a gas phase polymerization process.

Accordingly, the present invention also provides a process for the recovery of unreacted monomers from a gas phase polymerization process, comprising the steps of
recovering a fluid stream generated by the separation of the polyolefin product from the polymerization fluid comprising unreacted monomers and optionally comonomers by purging said polymerization product with an inert gas;
contacting said fluid stream comprising unreacted monomers, inert gas and optionally comonomers in an absorption zone with a scrub liquid comprising at least one $C_{4-10}$ hydrocarbons, thereby absorbing at least a portion of the unreacted monomers in said scrub liquid; and
withdrawing from said absorption zone (i) a vapor overhead comprising said purge inert gas and (ii) an absorber bottoms scrub liquid comprising said $C_{4-10}$ hydrocarbons and said unreacted monomer;
flashing to a reduced pressure said absorber bottoms scrub liquid, and separating the resulting flashed stream into a vapor containing the unreacted monomer and a liquid comprising said $C_{4-10}$ hydrocarbons.

Preferably, said $C_{4-10}$ hydrocarbon is selected from hexane, hexene-1, or octane. The vapor containing the unreacted monomer can also be compressed and recycled to said polymerization process. In this process also, the liquid comprising said $C_{4-10}$ hydrocarbons can be cooled and pumped back to said absorption zone as the scrub liquid. The fluid stream comprising unreacted monomers, purge gas and optionally comonomers can also be compressed and cooled prior to treatment in said gas-liquid absorption zone.

The process is therefore particularly useful in an alpha-olefin polymerization reactor wherein the polymerization is performed under high pressure, and more especially into slurry or gas-phase reactor. In particular a gas-phase alpha-olefin polymerization reactor such as for example into a gas-phase fluidized-bed reactor or in a gas-phase stirred reactor. Preferably, said reactor is operated, for example under fluidized bed conditions.

Typically, in a gas phase polymerization, a continuous circulation of gas stream takes place between the reactor and an external cooling system. This gas stream is heated in the reactor by the heat of polymerization and this heat is removed from the recycle composition in another part of the cycle by a cooling system external to the reactor. The gaseous stream containing one or more monomers may be continuously cycled through a fluidized bed in the presence of a catalyst under reactive conditions. Simultaneously, polymer product is withdrawn from the reactor, some gas is extracted from the reactor with the polymer. Fresh monomer is added to replace the polymerized monomer. Alternatively, other types of gas phase polymerization processes can also be used.

A gas phase process can generates the polymer product together with a stream at low pressure that is mainly composed of monomer and nitrogen. Some other components like comonomer (butene, hexene, other alpha-olefins . . . ) and hydrogen can also be present in the stream. Nitrogen and hydrogen have to be purged from this steam to avoid accumulation. The case of ethylene is exemplified, but in a non limitative manner.

In an embodiment, the typical composition of this stream comprises about 15 to 85% of ethylene, about 15 to 85% of nitrogen, about 0 to 5% of comonomer and about 0 to 10% of hydrogen. For example the stream withdrawn together with the polymer from the polymerization process comprises at least 90% ethylene+nitrogen with the ethylene/nitrogen ratio ranging from ½ to 2 (for example: ethylene for 30 to 60% and $N_2$ from 60 to 30%).

The fluid stream generated by the separation of the polyolefin product from the polymerization fluid comprising unreacted monomers and optionally comonomers can be at low pressure ranging from about 1.5 to 5 bar and medium temperature ranging from about 50 to 100° C.

The present invention therefore also concerns a process for the recovery of unreacted monomers from a gas phase polymerization process, comprising the steps of
  recovering a fluid stream generated by the separation of the polyolefin product from the polymerization fluid comprising unreacted monomers and optionally comonomers by purging said polymerization product with an inert gas;
  contacting said fluid stream comprising unreacted monomers, inert gas and optionally comonomers in an absorption zone with a scrub liquid comprising at least one hydrocarbons, thereby absorbing at least a portion of the unreacted monomers in said scrub liquid; and
  withdrawing from said absorption zone (i) a vapor overhead comprising said purge inert gas and (ii) an absorber bottoms scrub liquid comprising said $C_{4-10}$ hydrocarbons and said unreacted monomer;
  flashing to a reduced pressure said absorber bottoms scrub liquid, and separating the resulting flashed stream into a vapor containing the unreacted monomer and a liquid comprising said $C_{4-10}$ hydrocarbons.

Although nitrogen is the preferred purge gas, any inert gas can be utilized as long as it is compatible with the withdrawal and handling of the polymer product, and with downstream processing of the fluid stream.

In an embodiment, said vapor containing the unreacted monomer is compressed and recycled to said polymerization process. In a particular embodiment, said liquid comprising said $C_{4-10}$ hydrocarbons is cooled and pumped back to said absorption zone as the scrub liquid.

In an embodiment, said fluid stream comprising unreacted monomers, purge gas and optionally comonomers is compressed and cooled prior to treatment in said gas-liquid absorption zone.

Figure 1:
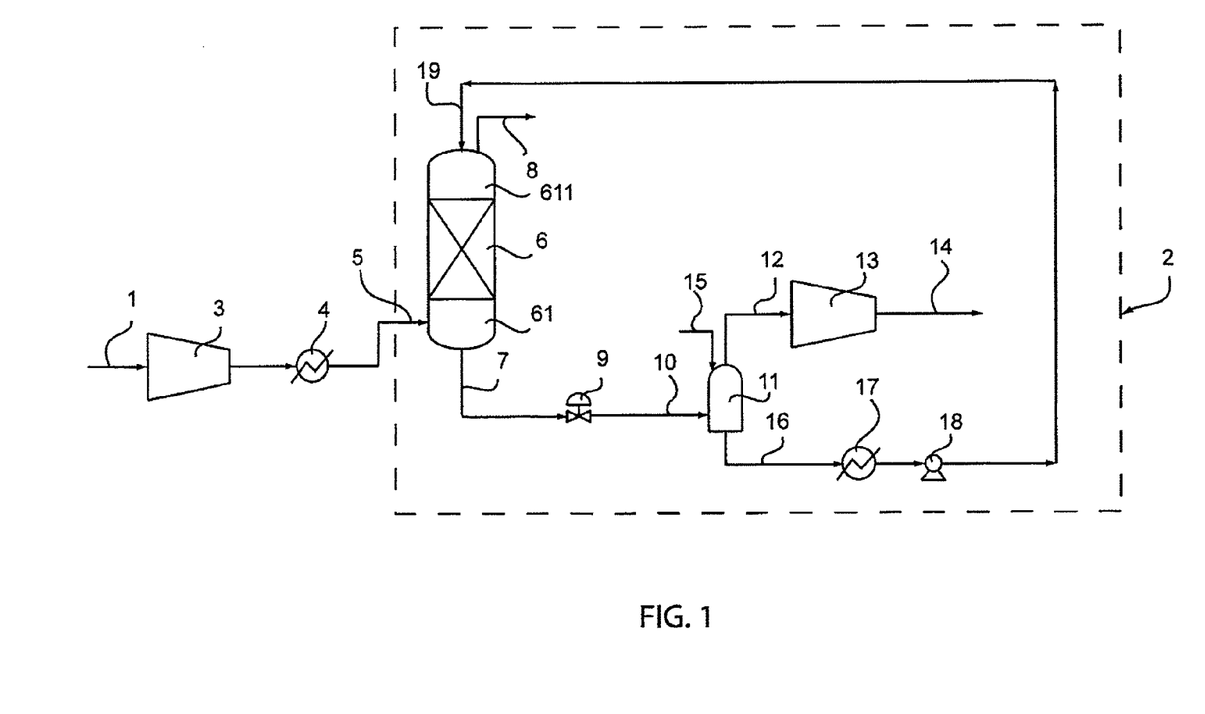
FIG. 1 schematically represents a unit for monomer recovery from a gas phase polymerization comprising an absorption-desorption unit according to an embodiment of the present invention.

The invention can be understood in detail with reference to the embodiment given in FIG. 1. Said figure shows an absorption desorption unit 2, wherein a fluid stream 1 obtained by the separation of the polyolefin product from the polymerization fluid comprising unreacted monomers and optionally comonomers by purging said polymerization product with an inert gas (not shown) is treated. Said fluid stream 1 is compressed to 10-50 bar (preferably 15 to 30 bar) by compressor 3, and cooled by cooler 4 to yield cooled fluid stream 5.

Said fluid stream 5 is introduced into the bottom 61 of scrub column 6 and is contacted therein with scrub liquid 19, which absorbs at least a portion of the unreacted monomers and is withdrawn as an absorber bottoms scrub liquid 7. The top 611 of the scrub column is fed with the scrub liquid 19.

A gas 8 enriched in inert components is withdrawn from the top 611 of the scrub column 6 and can be further purged to the flare or reused in another part of the process (not shown).

The absorber bottoms scrub liquid 7 recovered at the bottom 61 of the scrubber 6 comprises the scrub liquid and at least a portion of the unreacted monomer. This absorber bottoms scrub liquid 7 is sent to the desorption unit 11, and is first flashed to about 1-5 bar (preferably 1.5-3 bar) in an expansion valve 9. The flashed stream 10 is sent to the liquid-gas separator 11, wherein a gas phase comprising a major part of the unreacted monomer 12 is compressed up to 30 bar in compressor 13 is reused 14 as monomer in the polymerization. The liquid phase 16 withdrawn from the desorption unit 11 comprising the scrub liquid 19 is cooled in a cooler 17 and further pumped back by a pump 18 to the scrub column 6. Optionally, a make up liquid 15 can be added at the top of said liquid-gas separator 11.

The scrub liquid is able to dissolve ethylene, has little affinity for hydrogen and nitrogen and is preferably compatible with the polymerization process and. In a preferred embodiment, there should be a high difference in boiling point between scrub liquid and the unreacted monomer to be recovered. In an embodiment, said scrub liquid is preferably chosen form C4-C12 alkanes or alkenes, more preferably C6-C10 alkanes or alkenes, yet more preferably C6-C8 alkanes or alkenes.

In another embodiment according to the invention, said polymerization reaction is a slurry polymerization process.

The present invention is therefore also applicable to any process producing an effluent comprising a slurry of particulate polymer solids suspended in a liquid medium comprising a diluent and unreacted monomer. Such reaction processes include those which have come to be known in the art as particle form polymerizations.

More in particular, the present invention relates to a separation process of a hydrocarbon-containing feed, wherein said hydrocarbon-containing feed stream comprising olefin monomer, co-monomer and hydrocarbon diluent is an effluent stream obtained from a polymerization process for preparing polyethylene; and preferably for preparing monomodal or bimodal polyethylene. Ethylene polymerizes in a liquid diluent in the presence of a catalyst, optionally a co-catalyst, optionally a co-monomer, optionally hydrogen and optionally other additives, thereby producing polymerization slurry. In a preferred embodiment, present invention is particularly suitable for the polymerization of ethylene in isobutane diluent.

Suitable ethylene polymerization includes but is not limited to homopolymerization of ethylene, copolymerization of ethylene and a higher 1-olefin co-monomer such as 1-butene, 1-pentene, 1-hexene, 1-octene or 1-decene. In an embodiment of the present invention, said co-monomer is 1-hexene. In a preferred embodiment, the present invention is directed to the recovery process of unreacted monomer from vaporous stream, which is issued from the effluent of an ethylene polymerization reaction wherein reactants including the monomer ethylene, isobutane as hydrocarbon diluent, a catalyst, the co-monomer 1-hexene and hydrogen are used.

More in particular, the present invention particularly suitable for the recovery of unreacted monomers from polymerization process for preparing polyethylene, and preferably for preparing monomodal or bimodal polyethylene. Preferably, separated monomer, hydrocarbon diluent and co-monomer are re-used in said polymerization process "Bimodal PE" refers to PE that is manufactured using two reactors, which are connected to each other in series, the operating conditions being different in the two reactors. "Monomodal PE" is produced in a single reactor or using two reactors in series, with identical operating conditions.

As used herein, the term "polymerization slurry" or "polymer slurry" or "slurry" means substantially a multi-phase composition including at least polymer solids and a liquid phase and allows for a third phase (gas) to be at least locally present in the process, the liquid phase being the continuous phase. The solids include catalyst and a polymerized olefin; such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

The present invention is particularly suitable for polymerization process for the manufacture of particulate olefin polymers consisting of the catalytic polymerization of olefins such as $C_2$ to $C_8$ olefins in a diluent containing the monomer to be polymerized, the polymerization slurry being circulated in a loop reactor to which the starting material is fed and from which the polymer formed is removed. Examples of suitable monomers include but are not limited to those having 2 to 8 carbon atoms per molecule, such as ethylene, propylene, butylene, pentene, butadiene, isoprene, 1-hexene, 1-methylpentene and the like.

The polymerization reaction can be carried out at a temperature of from 50 to 120° C., preferably at temperature of from 70 to 115° C., more preferably at temperature of from 80 to 110° C., and at a pressure of from 20 to 100 bar, preferably at pressure of from 30 to 50 bar, more preferably at pressure of 37 to 45 bar.

Suitable diluents are well known in the art and include but are not limited to hydrocarbon diluents such as aliphatic, cycloaliphatic and aromatic hydrocarbon solvents. The preferred solvents are $C_{12}$ or lower, straight chain or branched chain, saturated hydrocarbons, $C_5$ to $C_9$ saturated alicyclic or aromatic hydrocarbons. No limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene. In a preferred embodiment of the present invention, said diluent is isobutane. However, it should be clear from the present invention that other diluents may as well be applied according to the present invention.

Suitable catalysts are well known in the art. Examples of suitable catalysts include but are not limited to chromium oxide such as those supported on silica or aluminum, organometallic catalysts including those known in the art as "Ziegler" or "Ziegler-Natta" catalysts, metallocene catalysts and the like. The term "co-catalyst" as used herein refers to materials that can be used in conjunction with a catalyst in order to improve the activity of the catalyst during the polymerization reaction.

Preferably, said polymerization reaction is a slurry polymerization process using isobutane as diluent and hexene as comonomer.

The present invention therefore also concerns a process for the recovery of unreacted monomers from a slurry polymerization process comprising the steps of
   a) recovering a fluid stream from a polymer slurry comprising essentially liquid diluent, unreacted monomer, comonomers and solid polyolefin particles, by separating at least a majority of the diluent and unreacted monomer and comonomers from said solid particles,
   b) distilling said fluid stream, and withdrawing from said distillation a bottom stream comprising $C_{4-10}$ hydrocarbons, and an overhead stream comprising unreacted monomer and diluent,
   c) distilling said overhead stream and withdrawing (i) a bottom stream comprising substantially olefin-free hydrocarbon diluent, optionally a side stream comprising hydrocarbon diluent, and (ii) an overhead vapor stream comprising unreacted monomer and light gas,
   d) contacting said removed overhead vapor stream in an absorption zone with a scrub liquid comprising at least one $C_{4-10}$ hydrocarbons, thereby absorbing at least a portion of the unreacted monomers in said scrub liquid; and
   e) withdrawing from said absorption zone (i) a vapor overhead and (ii) an absorber bottoms scrub liquid comprising said $C_{4-10}$ hydrocarbons and said unreacted monomer.

In an embodiment, said overhead vapor stream of step (c) comprising unreacted monomer and light gas is compressed and cooled prior to treatment in said gas-liquid absorption zone.

In another embodiment, the present provides for a process for the recovery of unreacted monomer comprising stream comprising the steps of:
(l) passing a fluid stream to a first distillation zone for subjecting said stream to distillation conditions adapted to remove i1) a bottom stream comprising co-monomer, and i2) an overhead stream comprising hydrocarbon diluent, unreacted olefin monomer and further components such as $H_2$, $N_2$, $O_2$, CO, $CO_2$, and formaldehyde, and
(m) introducing the overhead stream of step (l) in a second distillation zone for subjecting said stream to distillation conditions adapted to remove (ii1) a bottom stream comprising substantially olefin-free hydrocarbon diluent, (ii2) a side stream comprising hydrocarbon diluent, and (ii3) an overhead vapor stream comprising olefin monomer, diluent and further components such as formaldehyde, $H_2$, $N_2$, $O_2$, CO and $CO_2$, and
(n) and contacting said removed overhead vapor stream—in an absorption zone—with a scrub liquid comprising at least one $C_{4-10}$ hydrocarbons, thereby absorbing at least a portion of the unreacted monomers in said scrub liquid.

According to an embodiment, the bottom stream of step (b) or (l) comprising $C_{4-10}$ hydrocarbons, is combined with makeup scrub liquid and cooled to provide said scrub liquid feed to said gas-liquid absorption zone.

In a preferred embodiment, said absorber bottoms scrub liquid is recycled to the polymerization reaction.

In another embodiment, said absorber bottoms scrub liquid is further treated to recover said unreacted monomer. Preferably, said unreacted monomer is recovered from said absorber bottoms scrub liquid by first flashing to a reduced pressure said absorber bottoms scrub liquid, and separating the resulting flashed stream into a vapor containing the unreacted monomer and a liquid comprising said $C_{4-10}$ hydrocarbons. Preferably, said vapor containing the unreacted monomer is compressed and recycled to said polymerization process, and said liquid comprising said $C_{4-10}$ hydrocarbons is cooled and pumped back to said absorption zone as the scrub liquid.

Figure 2:
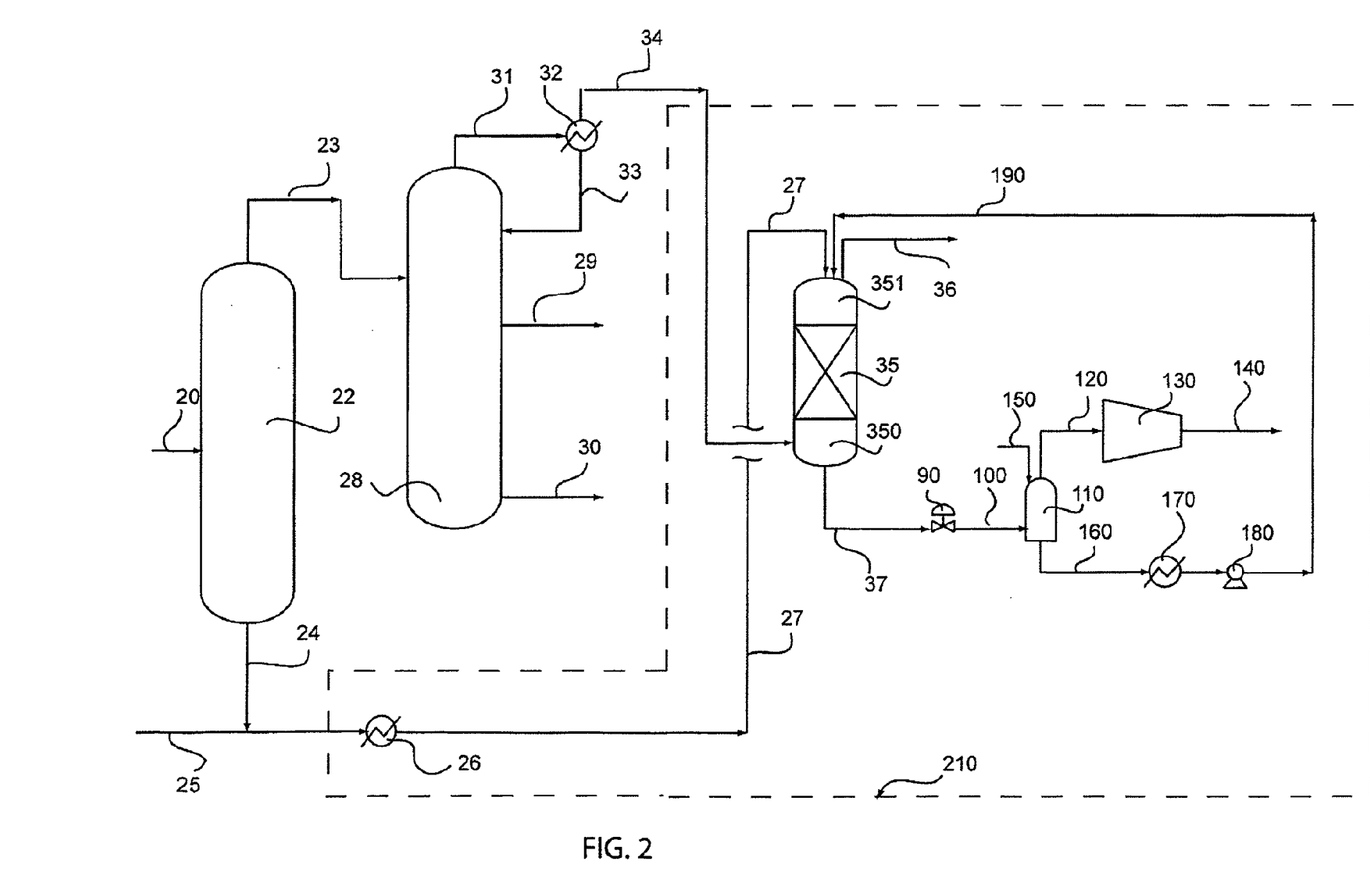
FIG. 2 schematically represents a unit for monomer recovery from a slurry polymerization comprising an absorption-desorption unit according to an embodiment of the present invention.

FIG. 2 shows an absorption desorption unit 210, wherein a fluid stream 34 obtained after distillation is treated.

A fluid stream 20 comprising unreacted monomer, diluent and comonomers is recovered from a polymer slurry by separating at least a majority of the diluent and unreacted monomer and comonomers from the formed polymer (not shown). The fluid stream 20 that is to be separated will generally be an overhead stream coming from a flash tank and purge columns of a polymerization reactor, wherein a stream containing solvent (solvent=diluent), polymer and unreacted monomers is flashed or otherwise treated to remove solvent or diluent and monomers there from. A presently preferred component stream separated according to the invention comprises monomer, such as ethylene, co-monomer, such as 1-hexene, and diluent, such as isobutane. It should be recognized however, that the recovery process of the present invention is equally applicable to other monomer, co-monomer and diluent systems so long as feed vapors comprise hydrocarbons, which permit separation by distillation. Traces of both heavier, e.g. oligomers, and lighter components such as formaldehyde, $N_2$, $H_2$, and components such as $O_2$, CO and $CO_2$ are generally also present in such effluent streams. Said fluid stream 20 is distilled in a first distillation column 22. A bottom stream 24 comprising $C_{4-10}$ hydrocarbons, and an overhead stream 23 comprising unreacted monomer and diluent are withdrawn from said distillation column 22. Said first column is also referred as "Heavies column". The bottom stream 24 of said column can be for example mainly hexene, which can be recycled back to the polymerization process or combined with a make up fluid 25 of scrub liquid. The overhead stream 23 is sent to a second column 28 (also referred as "lights column"). Substantially pure isobutane, so-called "substantially olefin-free" isobutane is obtained as liquid bottom product 30. Light components such as formaldehyde, $H_2$, $N_2$, $O_2$, CO and $CO_2$ exit the distillation column 28 with unreacted monomers, and some residual isobutane as an overhead vapor stream 31. Remaining isobutane exits the column 28 as a liquid side stream 29. Both the substantially olefin-free isobutane diluent and the isobutane diluent are recycled and re-used in a polymerization process.

The overhead vapor stream 31 comprising unreacted monomer and diluent is removed from said distillation column 28 and cooled in a cooling unit 32. The make up fluid 25 can be chosen among the liquid exits of lights column, for instance streams 29 or 30, but many other liquids streams of the whole polymerization process are also suitable.

In an embodiment, said overhead vapor stream comprises about 25 to 95 wt % ethylene, about 2 to 10 wt % ethane, about 5 to 30 wt % isobutane, about 0 to 1 wt % nitrogen and about 0 to 4 wt % hydrogen. The pressure of this stream is at about 5-20 bar, preferably 10-15 bar, and the temperature: −30 to +30° C., preferably −15 to +15° C.

The cooled overhead vapor stream 34 is introduced into the bottom 350 of scrub column 35 and is contacted therein with scrub liquid 190 which absorbs at least a portion of the unreacted monomers and is withdrawn as an absorber bottoms scrub liquid 37. The top 351 of the scrub column 35 is fed with the scrub liquid 190.

In an embodiment, the bottom stream 24 comprising $C_{4-10}$ hydrocarbons (for example the comonomer bottom 24 of the heavies column 22), is combined with makeup scrub liquid 25 and cooled 26 to provide scrub liquid feed 27 to said scrub column 35.

A gas 36 enriched in inert components is withdrawn from the top 351 of the scrub column 35 and can be further purged to the flare or reused in another part of the process (not shown).

The absorber bottoms scrub liquid 37 recovered at the bottom 350 of the scrubber 35 comprises the scrub liquid and at least a portion of the unreacted monomer. This absorber bottoms scrub liquid 37 is sent to the desorption unit 110, and is first flashed to about 1-5 bar (preferably 1.5-3 bar) in an expansion valve 90. The flashed stream 100 is sent to the liquid-gas separator 110, wherein a gas phase comprising a major part of the unreacted monomer 120 is compressed up to 30 bar in compressor 130 is reused 140 as monomer in the polymerization. The liquid phase 160 withdrawn from the desorption unit 110 comprising the scrub liquid is cooled in a cooler 170 and further pumped back 190 by a pump 180 to the scrub column 35. In an embodiment, not shown herein, the bottom stream 24 comprising $C_{4-10}$ hydrocarbons (for example the comonomer bottom 24 of the heavies column 22), is combined with makeup scrub liquid 25 and cooled 26 to provide make up liquid 150 to said liquid-gas separator 110.

Figure 3:
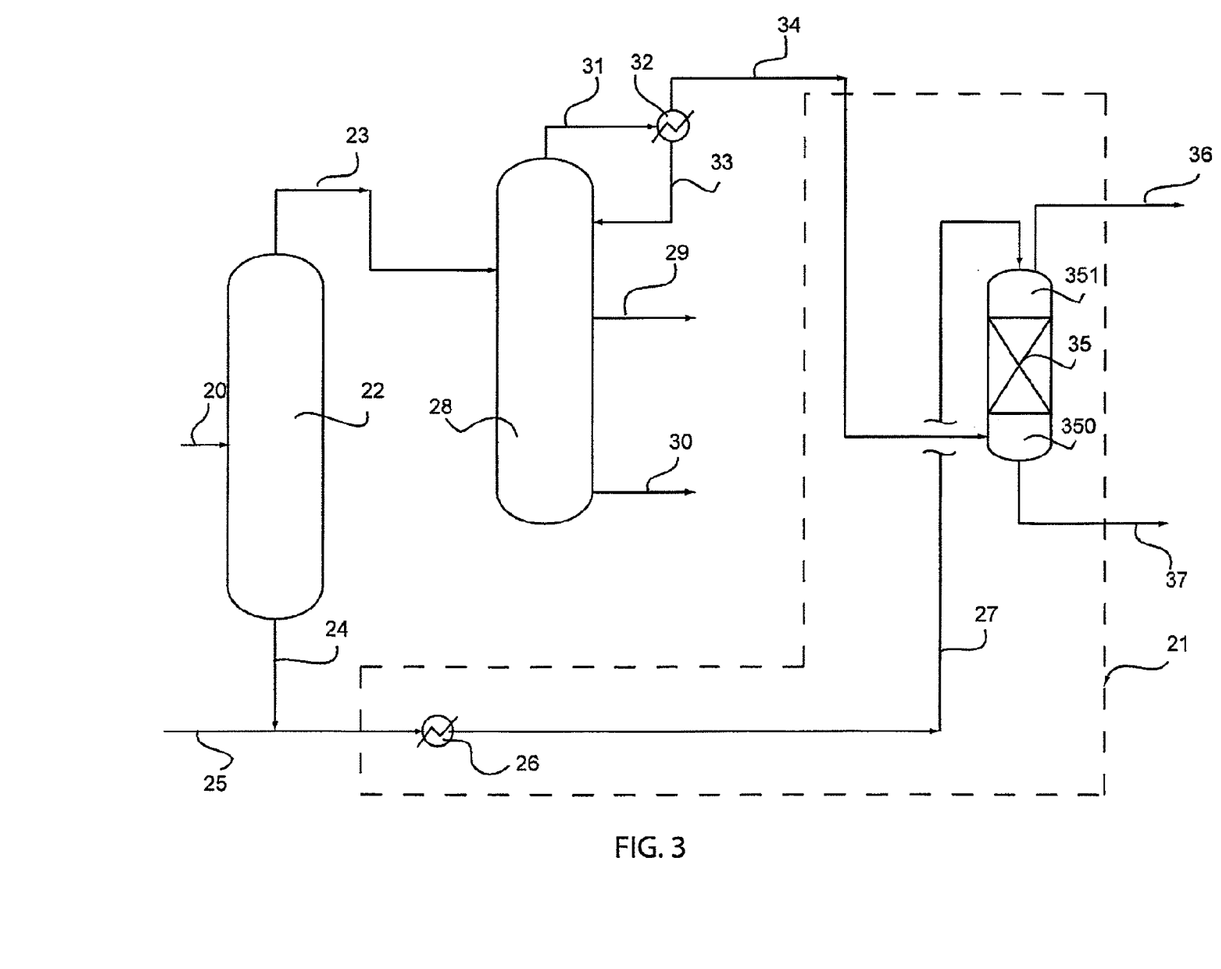
FIG. 3 schematically represents a unit for monomer recovery from a slurry polymerization unit comprising an absorption unit according to an embodiment of the present invention.

FIG. 3 shows an absorption unit 21, wherein a fluid stream 34 obtained after distillation is treated.

As in FIG. 2 a fluid stream 20 comprising unreacted monomer, diluent and comonomers is recovered from a polymer slurry. Said fluid stream 20 is distilled in a first distillation column 22. A bottom stream 24 comprising $C_{4-10}$ hydrocarbons, and an overhead stream 23 comprising unreacted monomer and diluent are withdrawn from said distillation column 22. The bottom stream 24 of said column can be for example mainly hexene which can be recycled back to the polymerization process or combined with a make up fluid 25 of scrub liquid.

The overhead stream 23 is sent to a second column 28 (also referred as "lights column"). Substantially pure isobutane, so-called "substantially olefin-free" isobutane is obtained as liquid bottom product 30. Light components such as formaldehyde, $H_2$, $N_2$, $O_2$, CO and $CO_2$ exit the distillation column 22 with unreacted monomers, and some residual isobutane as an overhead vapor stream 31. Remaining isobutane exits the column 28 as a liquid side stream 29. Both the substantially olefin-free isobutane diluent and the isobutane diluent are recycled and re-used in a polymerization process.

The overhead vapor stream 31 comprising unreacted monomer and diluent is removed from said distillation column 28 and cooled in a cooling unit 32.

The cooled overhead vapor stream 34 is introduced into the bottom 350 of scrub column 35 and is contacted therein with scrub liquid 27 which absorbs at least a portion of the unreacted monomers and is withdrawn as an absorber bottoms scrub liquid 37. The top 351 of the scrub column 35 is fed with the scrub liquid 27.

The make up fluid 25 can be chosen among the liquid exits of lights column, for instance streams 29 or 30, but many other liquids streams of the whole polymerization process are also suitable.

In an embodiment, the bottom stream 24 comprising $C_{4-10}$ hydrocarbons (for example the comonomer bottom 24 of the heavies column 22), is combined with makeup scrub liquid 25 and cooled 26 to provide scrub liquid feed 27 to said scrub column 35.

The absorber bottoms scrub liquid 37 recovered at the bottom 350 of the scrubber 35 comprises the scrub liquid and at least a portion of the unreacted monomer. According to this embodiment said absorber bottoms scrub liquid 37 is recycled as such, without further treatment to the polymerization process. The process described in FIG. 3 has the advantage of consuming less energy, and recycles bottom stream 24 comprising $C_{4-10}$ hydrocarbons which provide scrub liquid feed 27 to the scrub column 35.

The term "distillation zone", "separation column" and "distillation column" may be used herein as synonyms.

In an embodiment, one or more of said distillation columns are tray columns. Such tray columns comprise a number of trays of various designs to hold up the liquid in order to provide better contact between vapor and liquid. Trays essentially act as a unit operation, each accomplishing a fraction of the separation between liquid and gas. It is clear that the more trays there are, the better the degree of separation, and thus the better column performance will be. However, using a large number of trays in distillation columns has important disadvantages, especially with regard to construction. Suitable distillation systems comprise distillation system having column(s) with a low number of trays, preferably lower than 25, even more preferred lower than 20. Nevertheless, although distillation columns with a low number of trays can be used in the present process, improvements on the operation of the present systems, as explained into more detail below, permit to achieve a similar degree of separation as for columns with a higher number of trays. Advantageously, application of the present process includes the benefits of less energy usage and lower construction costs. In an alternative embodiment, one or more of said distillation columns are divided wall distillation column or divided wall column. Such column is a distillation vessel having a vertical partition separating one side from the other for a portion or all of the height of the vessel. Although such column comprises a larger number of trays, the use of such single column may be advantageous with regard to construction costs and energetic requirements.

In another embodiment, one or more of said distillation columns are packing columns. Packing column refers to column packed with inert solid particles.

The fluid stream coming from the flash tanks also comprises traces of both heavier, e.g. oligomers, and lighter components including $N_2$, $H_2$, and light poisonous components such as $O_2$, CO and $CO_2$, and formaldehyde. Such components are herein also denoted as "poisonous components", because such components are detrimental for the activity of a catalyst. Re-introduction thereof into a polymerization reactor could greatly disturb catalyst activity and thus reduce polymerization efficiency. It is therefore of the utmost importance to have a recovery system adapted to recover essentially pure streams of (co-)monomer, and diluent, without substantial residual amount of such poisonous components for re-use in a polymerization process.

In general, the distillation zone is used for the separation of three main components, comonomer, diluent, and monomer. The major component is the diluent, with a part of 90-95 wt % of the feed stream of the distillation section.

A first column splits all components heavier than the diluent (in bottom), the top of the column (overhead stream) is sent to a second column.

The second column removes from the diluent lighter components, in order to get pure diluent. According to the present invention, the top of the column (i.e. the overhead stream) is further treated in an absorption/desorption unit to recover unreacted monomer therefrom.

According to an embodiment of the present process the feed stream is passed to a distillation column and subjected to distillation conditions adapted to remove a bottom stream comprising substantially olefin-free hydrocarbon diluent, optionally a side stream comprising hydrocarbon diluent, and an overhead vapor stream comprising olefin monomer, diluent and further components such as $H_2$, $N_2$, $O_2$, CO, $CO_2$ and formaldehyde. Said overhead vapor stream is further contacted in an absorption zone with a scrub liquid comprising at least one $C_{4-10}$ hydrocarbons, thereby absorbing at least a portion of the unreacted monomers in said scrub liquid. In an embodiment, said overhead vapor stream is cooled in a vent condenser prior to being contacted with the scrub liquid in said absorption zone.

The bottom stream comprises substantially olefin-free hydrocarbon diluent. The term "substantially olefin-free hydrocarbon diluent" or "olefin-free diluent" or the like are used herein as synonyms to denote hydrocarbon diluent which contains less than 5000 ppm, and preferably less than 1000 ppm, and even more preferred less than 100 ppm of monomer and/or co-monomer. Substantially free of traces of monomer such as ethylene and/or co-monomer such as hexene, the bottom stream of olefin free hydrocarbon diluent, such as isobutane, issued from the distillation column can be sent to a storage tank and further used, e.g. for flushing conduits and circulation pumps in a polymerization reactor or for catalyst preparation e.g. in mud pots. This olefin-free diluent can be recycled to a polymerization zone, whether homo-polymerization or co-polymerization, at any place, of the process where pure diluent is requested, like the catalyst dilution.

The side stream of hydrocarbon diluent issued from the distillation column is generally sent to a storage tank and further used. Preferably, the amount of further components such as $H_2$, $N_2$, $O_2$, CO and $CO_2$, formaldehyde in the side stream is lower than 10 ppm, and preferably lower than 1 ppm, and even more preferred lower than 0.5 ppm. In another preferred embodiment, the amounts of monomer and/or co-monomer remaining in the side stream are lower than 25% and preferably lower than 10% and even more preferred lower than 5%. High amounts of monomer in the storage tank of the side-stream product may lead to evaporation and substantial monomer loss. By keeping the amount of monomer in the side-stream product below 25% and preferably below 10%, or even below 5%, evaporation of monomer from the storage tank can be reduced and storage of the side-stream product at atmospheric conditions becomes possible. The hydrocarbon diluent issued from the side stream exiting from the distillation zone is generally used as diluent in a polymerization reactor, either homo-polymerization or co-polymerization depending upon monomers being subjected to polymerization. It is in particular very suitable for use as diluent especially in a second polymerization reactor when polymerizing under bimodal operation, or in a first as well as a second reactor, when polymerizing under monomodal operation.

Light components such as formaldehyde, $H_2$, $N_2$, $O_2$, CO and $CO_2$ exit the distillation zone with unreacted monomer and diluent as an overhead vapor stream. According to the invention, said overhead vapor stream is further contacted in an absorption zone with a scrub liquid comprising at least one $C_{4-10}$ hydrocarbons, thereby absorbing at least a portion of the unreacted monomers in said scrub liquid. In an embodiment, said overhead vapor stream is cooled prior to being contacted with the scrub liquid in said absorption zone.

The above-described processes according to the present invention can be further optimized. Said optimization may consists in maximizing the overhead stream (e.g. b3) obtained from the distillation column by adapting the ratio of the bottom stream flow removed from the distillation column to the feed stream flow introduced in the distillation column. In an embodiment, said ratio is lower than or equal to 1.0, and preferably comprised between 0.3 and 1.0, and more preferably between 0.4 and 0.95, and may for instance comprise 0.4, 0.5, 0.6, 0.7, 0.8 or 0.9. The ratio set point of bottom stream flow to feed stream flow which is suitable according to the present process can be adjusted manually or automatically, to ensure enough olefin free diluent product and suitable venting to the ethylene recovery unit to remove light components. The ratio can be adapted by adapting the reflux to the distillation column. Said optimization may also consist in diluting the side stream obtained in the distillation column with the bottom stream obtained in the distillation column. Generally, the bottom stream of olefin free hydrocarbon diluent issued from the distillation column, and the side stream of hydrocarbon diluent are both sent to separate storage tanks. Diluting the side stream with the bottom stream permits to control the level of product in the storage tanks for the side-stream product and for the bottom-stream product. Diluting the side stream with the bottom stream is further required in view of controlling the ratio of the bottom stream flow to the feed stream flow.

Other improvements to the operation of the distillation column include improvements for stabilizing the distillation conditions in the distillation column. For that, a further step can be provided of re-boiling a portion of the bottom stream obtained in the distillation column under controlled steam flow rate and returning said re-boiled portion to the distillation column.

The rate of the steam flow can be controlled in function of the temperature in the distillation column. Preferably, the steam flow rate is controlled in function of the temperature on a tray located in the lower half of the column, i.e. equal to or lower than % of the height of the column, and even more preferred located in the lower quarter of the column, i.e. equal to or lower than % of the height of the column. Preferably, this temperature is used as an input parameter in a temperature controller system driving and controlling the reboiler steam flow rate. In addition, in order to make the control system as insensitive as possible to pressure variations in the distillation zone, the controller parameters have been chosen so as to obtain a relatively slow reaction of the controller system.

In addition, the sump level of the distillation column can be adapted to the bottom stream flow by means of a level controller.

Thus, the embodiments of the present invention provide improved methods for recovering unreacted monomer such as ethylene or propylene from polyolefin polymerization process. According to the present invention, unreacted monomers are recovered by absorption in a liquid comprising $C_{4-10}$ hydrocarbon which is compatible with the polyolefin reactor operation. Compared to prior art process, the present process has the advantage of being a simplified process which does not require several counter flow heat exchangers for recovering the unreacted monomers. Moreover, the use of absorption desorption unit allows a decoupling of the scrub loop and the reactor itself. The efficiency of absorption can be adjusted by the ratio between the flow rates of absorption liquid and gas sent to the scrub unit. This ratio is fixed based on the targeted recovery of ethylene, and is independent of the flow rate of scrub liquid acceptable in the reactor.

While the invention has been described in terms of the presently preferred embodiment, reasonable variations and modifications are possible by those skilled in the art and such variations are within the scope of the described invention and the appended claims.

This invention can be further illustrated by the following examples of preferred embodiments thereof, although it will be understood that this example is included merely for purposes of illustration and are not intended to limit the scope of the invention unless otherwise specifically indicated.

EXAMPLES

Example 1

Example 1 refers to the FIG. 1. The stream coming from the reactor degassing system is compressed up to 23 barg and the cooled to 5° C. This stream has the following composition: 51 wt % nitrogen, 43 wt % ethylene and 6 wt % 1-hexene. This gaseous stream is sent to the scrub unit. The scrubber is a column with 3 trays.

The scrub unit is fed with hexane used as example of absorption liquid, absorbent flow rate equals 2 times the gas flow rate. The temperature of the scrub unit is variable, between −20° C. and +10° C.

Depending on temperature, the monomer recovered by the scrub unit varies between 30% (at 10° C.) and 40% (at −20° C.). This stream is then flashed and ethylene is desorbed, hexane is recycled back to the scrubber.

This low recovery rate is representative of a situation where a high purge of poisons is targeted.

Example 2

Example 2 also refers to the FIG. 1. The gas inlet of the scrub unit is unchanged in terms of composition, pressure and temperature compared to example 1. The scrub liquid is still hexane, at 0° C. and its flow rate is now variable, from 0.3 to 6 times the gas flow rate.

The recovery factor of ethylene varies between 15% and 80%, depending on the ratio liquid/gas.

Example 3

This example 3, describing the recovery of monomer in the slurry process, is supported by FIG. 3.

As in FIG. 2 a fluid stream 20 comprising unreacted monomer, diluent and comonomers is recovered from a polymer slurry. Said fluid stream 20 is distilled in a first distillation column 22. A bottom stream 24 comprising $C_{4-10}$ hydrocarbons, and an overhead stream 23 comprising unreacted monomer and diluent are withdrawn from said distillation column 22. The bottom stream 24 of said column can be for example mainly hexene which can be recycled back to the polymerization process or combined with a make up fluid 25 of scrub liquid.

The overhead stream 23 is sent to a second column 28 (also referred as "lights column"). Substantially pure isobutane, so-called "substantially olefin-free" isobutane is obtained as liquid bottom product 30. Light components such as $H_2$, exit the distillation column 22 with unreacted monomers, and some residual isobutane as an overhead vapor stream 31. The overhead vapor stream 31 comprising unreacted monomer and diluent is removed from said distillation column 28 and cooled in a cooling unit 32. The cooled overhead vapor stream 34 is introduced into the bottom 350 of scrub column 35 and is contacted therein with scrub liquid 27 which absorbs at least a portion of the unreacted monomers and is withdrawn as an absorber bottoms scrub liquid 37. The top 351 of the scrub column 35 is fed with the scrub liquid 27.

This process allows a recovery of the monomers while purging the lights as hydrogen. By a variation of the temperature in the scrubber and the flow rate of make up fluid 25, the balance between monomer recovery and lights purging can be adapted, as shown in the following table.

Data common to all cases:
  pressure in the scrubber: 12.5 bar g
  composition of the gas feed of the scrubber 34 (weight %):
    hydrogen: 2.5%
    ethylene: 39%
    alkanes (ethane, iso-butane): 58.5%
  composition of the bottom stream 24 (weight %)
    iso-butane: 10%
    hexene-1:90%
  composition of the liquid make up 25 (weight %)
    ethylene: 3.5%
    alkanes (ethane, iso-butane): 96.5%

| Case | Temperature of the scrubber (° C.) | Scrub liquid flow rate 24 (kg/h) | Make up liquid flow rate 25 (kg/h) | Monomer recovery (%) | Hydrogen purge (%) |
|---|---|---|---|---|---|
| 1 | −20° C. | 750 | 0 | 35.7 | 98.9 |
| 2 | 0° C. | 750 | 0 | 22.6 | 99.1 |
| 3 | −20° C. | 750 | 1000 | 56.4 | 97.6 |
| 4 | 0° C. | 750 | 1000 | 38.9 | 98.1 |

-continued

| Case | Temperature of the scrubber (° C.) | Scrub liquid flow rate 24 (kg/h) | Make up liquid flow rate 25 (kg/h) | Monomer recovery (%) | Hydrogen purge (%) |
|---|---|---|---|---|---|
| 5 | −20° C. | 750 | 2000 | 73.4 | 96.1 |
| 6 | 0° C. | 750 | 2000 | 54.3 | 96.8 |

The monomer recovery is expressed as the mass ratio between the ethylene recovered in the liquid (stream 37) and the ethylene entering the scrubber (stream 34). The hydrogen purge is expressed as the ration between the hydrogen purge in the scrubber (gas outlet of the scrubber, 36) and the hydrogen entering the scrubber (stream 34).

What is claimed is:

1. A process for the recovery of unreacted monomers from a slurry polymerization process comprising:
    (a) recovering a fluid stream from a polymer slurry comprising essentially liquid diluent, unreacted monomer, comonomers and solid polyolefin particles, by separating at least a majority of the diluent and unreacted monomer and comonomers from said polyolefin solid particles;
    (b) distilling said fluid stream, and withdrawing from said distillation a bottom stream comprising $C_{4-10}$ hydrocarbons, and an overhead stream comprising unreacted monomer and diluent;
    (c) distilling said overhead stream and withdrawing (i) a bottom stream comprising substantially olefin-free hydrocarbon diluent, optionally a side stream comprising hydrocarbon diluent, and (ii) an overhead vapor stream comprising unreacted monomer and light gas;
    (d) contacting said removed overhead vapor stream in a gas-liquid absorption zone with a scrub liquid comprising at least one $C_{4-10}$ hydrocarbons, thereby absorbing at least a portion of the unreacted monomers in said scrub liquid; and
    (e) withdrawing from said absorption zone (i) a vapor overhead and (ii) an absorber bottoms scrub liquid comprising said $C_{4-10}$ hydrocarbons and said unreacted monomer, wherein the bottom stream of step (b) comprising $C_{4-10}$ hydrocarbons, is combined with makeup scrub liquid and cooled to provide said scrub liquid feed to said gas-liquid absorption zone.

2. The process of claim 1, wherein said absorber bottoms scrub liquid is recycled to the polymerization reaction.

3. The process of claim 1, wherein said overhead vapor stream of step (c) comprising unreacted monomer and light gas is compressed and cooled prior to treatment in said gas-liquid absorption zone.

4. The process of claim 1, wherein said unreacted monomer is recovered from said absorber bottoms scrub liquid by first flashing to a reduced pressure said absorber bottoms scrub liquid, and separating the resulting flashed stream into a vapor containing the unreacted monomer and a liquid comprising said $C_{4-10}$ hydrocarbons.

5. The process of claim 4, wherein said vapor containing the unreacted monomer is compressed and recycled to said polymerization process.

6. The process of claim 4, wherein said liquid comprising said $C_{4-10}$ hydrocarbons is cooled and pumped back to said absorption zone as the scrub liquid.

* * * * *